United States Patent [19]

Fukushima et al.

[11] Patent Number: 4,801,155

[45] Date of Patent: Jan. 31, 1989

[54] ACTIVELY CONTROLLED AUTOMOTIVE SUSPENSION SYSTEM WITH ADJUSTABLE ROLLING-STABILITY

[75] Inventors: Naoto Fukushima, Kamakura; Hirotsugu Yamaguchi, Chigasaki; Yohsuke Akatsu, Yokohama, all of Japan

[73] Assignee: Nissan Motor Company, Limited, Yokohama, Japan

[21] Appl. No.: 60,911

[22] Filed: Jun. 12, 1987

[30] Foreign Application Priority Data

Jun. 12, 1986 [JP] Japan .................................. 61-137106

[51] Int. Cl.$^4$ ............................................. B60G 17/00
[52] U.S. Cl. ..................................... 280/707; 280/6 R; 180/41
[58] Field of Search .................... 280/64, 6 R, 707

[56] References Cited

U.S. PATENT DOCUMENTS

| 4,216,977 | 8/1980 | Fujii | 280/707 |
| 4,659,104 | 4/1987 | Tanaka | 280/707 |

FOREIGN PATENT DOCUMENTS

| 0193124 | 9/1986 | European Pat. Off. | |
| 197317 | 10/1986 | European Pat. Off. | 280/707 |
| 219866 | 4/1987 | European Pat. Off. | 280/707 |
| 60-252013 | 12/1985 | Japan. | |
| 2155207 | 9/1985 | United Kingdom | 280/707 |

Primary Examiner—Richard A. Bertsch
Attorney, Agent, or Firm—Foley & Lardner, Schwartz, Jeffery, Schwaab, Mack, Blumenthal & Evans

[57] ABSTRACT

An actively controlled suspension system includes a vehicle rolling responsive component to adjust the suspension characteristics for suppressing vehicular rolling. In addition, the actively controlled suspension control system may be provided for adjusting roll-stabilization load distribution between the front and rear suspension systems for adjusting vehicular cornering characteristics.

14 Claims, 6 Drawing Sheets

ACTIVELY CONTROLLED AUTOMOTIVE SUSPENSION SYSTEM WITH ADJUSTABLE ROLLING-STABILITY

BACKGROUND OF THE INVENTION

1. Field of the Invention

The present invention relates generally to an actively controlled suspension system which has adjustable suspension characteristics according to the vehicle driving condition. More specifically, the invention relates to an actively controlled suspension system which has adjustable rolling stability.

2. Description of the Background Art

Generally, a typical construction of a suspension assembly comprises a suspension coil and shock absorber and is interposed between a vehicle body and a suspension member supporting a vehicular wheel, in order to constitute automotive suspension system with the suspension member. The suspension coil spring generaly resists load applied to maintain the vehicle body and the road wheel in a predetermined positional relationship to each other. On the other hand, the shock absorber is intended to damp or absorb vibrations transmitted between the vehicle body and the road wheel. The automotive suspension system may be further provided with a roll-stablizer for suppressing vehicular rolling motion.

Some of the many kinds of automotive suspension systems include hydraulic circuits associated with fluid chambers in hydraulic shock absorbers for controlling balance between the fluid pressures in the fluid chambers according to the relative displacement between the vehicle body and road wheel. Such hydraulic circuits include a fluid pressure source supplying working fluid at a given pressure to the circuits, and pressure control valves. The pressure control valves hydraulically connect and disconnect the fluid pressure source to the fluid chambers of the hydraulic shock absorbers for controlling pressure supply. The pressure control valves are controlled by an electric or electronic control system which switches the various valve positions to selectively introduce or drain fluid pressure into or from the fluid chambers so as to generate a damping force which suppresses vehicle body and road wheel vibrations.

These conventional positively controlled suspension systems encounter various defects and have not been at all satisfactorily capable of suppressing vibrations or bouncing of the vehicle body in order to ensure riding comfort. Specifically, conventional systems produce damping force by means of an orifice in the hydraulic circuit. However, due to flow resistance through the orifice, fluid pressure differences between the fluid chambers in the shock absorber cannot be easily balanced. When the balance is disturbed, the shock absorber tends to transmit vibration of the road wheel to the vehicle body which degrades riding comfort.

In order to provide an improvement, a positively or actively controlled automotive suspension system has been proposed in European Patent First Publication No. 01 93 124, published on Sept. 3, 1986, and assigned to the common owner of the present invention. The proposed positively controlled automotive suspension system comprises a hollow cylinder defining a chamber, a piston thrustingly received within the chamber of the cylinder and defining therein a first and second fluid chambers, both filled with a working fluid the piston being free to move axially with the chamber, a fluid pressure source, a hydraulic circuit connecting the first and second fluid chamber and the fluid presure source, a pressure control valve disposed within the hydraulic circuit and adapted to selectively establish and block fluid communication between the first and second fluid chamber and the fluid pressure source, means responsive to relative displacement between a vehicle body and road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

Another type of active suspension system has been disclosed in 'Autocar' published by Haymarket Publishing Ltd., on Sept. 10, 1987. The disclosed system includes a single cylinder actuator which has a cylinder tube connected to the vehicle body and a piston with a piston rod connected to the suspension member. The cylinder actuator is connected to a hydraulic pressure source via an electromagnetic valve. The hydraulic cylinder is also connected to an accumulator via an orifice. With this construction, the pressurized fluid to absorb road shock and suppress attitutde change of the vehicle body has been supplied from the pressure source via the pressure control valve. This lowers responsibility of pressure control in the hydraulic actuator.

On the other hand, an automotive suspension system which has adjustable roll-stabilization ability has been disclosed in the Japanese Patent First Publication (Tokkai) No. Showa 60-252013. The disclosed suspension system allows mechanical adjustment of the roll-stabilization ability by providing mechanical coupling in a roll-stabilizer. However, this adjustable roll stabilizer cannot perform precise and wide range roll-stability adjustment.

SUMMARY OF THE INVENTION

It is an object of the present invention to provide an actively controlled suspension system which can provide roll-stabilization ability equivalent to the conventional mechanical roll-stabilizer.

Another object of the invention to provide an actively controlled suspension system which can provide wide adjustable range and precise roll-stability control.

A further object of the invention is to provide an actively controlled suspension system which allows adjustment of the vehicular cornering characteristics by adjusting roll-stability distribution between the front and rear suspension systems.

In order to accomplish the aforementioned and other objects, an actively controlled suspension system according to the present invention, includes a vehicular rolling detecting component to adjust the suspension characteristics for suppressing the vehicular rolling. In addition, the actively controlled suspension control system may be provided with means for adjusting roll-stabilization load distribution between the front and rear suspension systems for adjusting vehicular cornering characteristics.

According to one aspect of the invention, an actively controlled suspension system for an automotive vehicle comprises a first fluid pressure means provided at one lateral side of the vehicle body and interposed between a vehicle body and a suspension member rotatably supporting a road wheel, the first fluid pressure means having a first variable pressure chamber, a second fluid pressure means provided at the other lateral side of the vehicle body and interposed between a vehicle body and a suspension member rotatably supporting a road wheel, the second fluid pressure means having a second variable pressure chamber, a sensor means for monitoring relative distance between the vehicle body and the suspension member for producing a sensor signal indicative thereof, and a controller receiving the sensor signal to detect the vehicular rolling condition based thereon, and deriving a control signal based on the detected rolling condition for adjusting the fluid pressure in the first and second variable pressure chambers in such a manner that the fluid pressure in one of the first and second variable pressure chambers is increased and the fluid pressure in the other of the first and second variable pressure chamber is decreased in order to suppress vehicular rolling.

The magnitude of increasing of the fluid pressure in one of the first and second variable pressue chambers substantially corresponds with the magnitude of decreasing of the fluid pressure in the other of the first and second variable pressure chambers. The sensor means comprises a first sensor provided at one lateral side of the vehicle body for monitoring bounding and rebounding motion of the corresponding side of the vehicle body and a second sensor provided at the other lateral side of the vehicle body for monitoring bounding and rebounding motion of the corresponding side of the vehicle body. The controller devrives a difference between the output values of the first and second sensors for detecting rolling magnitude of the vehicle body for deriving the control signal. The controller further derives a rolling speed to derive a roll-damping factor value to modify the control signal value with the roll-damping factor indicating value.

According to another aspect of the invention, an actively controlled suspension system for an automotive vehicle comprises a first fluid pressure means provided at a front portion of a first lateral side of the vehicle body and interposed between the vehicle body and a suspension member rotatably supporting a road wheel, the first fluid pressure means having a first variable pressure chamber, a second fluid presusre means provided at the front portion of a second lateral side of the vehicle body and interposed between the vehicle body and a suspension member rotatably supporting a road wheel, the second fluid pressure means having a second variable pressure chamber, a third fluid pressure means provided at a rear portion of the first lateral side of the vehicle body and interposed between a vehicle body and a suspension member rotatably supporting a road wheel, the third fluid pressure means having a third variable pressure chamber, a fourth fluid pressure means provided at the rear portion of a second lateral side of the vehicle body and interposed between a vehicle body and a suspension member rotatably supporting a road wheel, the fourth fluid pressure means having a fourth variable pressure chamber, a sensor means including a first sensor located at the position correspond­ing to the first fluid pressure means, a second sensor located at the position corresponding to the second fluid pressure means, a third sensor located at the position correpsonding to the third fluid pressure means, and a fourth sensor located at the position correspond­ing to the fourth fluid pressure means, each of the sen­sors monitoring relative distance between the vehicle body and the suspension member at the corresponding position of the vehicle body, the first, second third and fourth sensors producing first, second, third and fourth sensor signals respectively indicating the relative dis­tance at the associated portion of the vehicle body, means for setting a roll-stabilization load distribution between the front side and rear side of the vehicle body for producing a front and rear roll-stabilization load distribution indicating value, and a controller receiving the sensor signals to detect vehicular rolling condition based thereon, and deriving a control signal based on the detected rolling condition and setting front and rear roll-stabilization load indicating values for adjusting the fluid pressure in the first and second variable pressure chambers in such a manner that the fluid pressure in one of the first and second variable pressure chambers is increased and the fluid pressure in the other of the first and second variable pressure chambers is decreased in order to suppress vehicular rolling.

The roll-stablization load setting means varies the front and rear roll-stabilization load distribution indicat­ing value for varying steering characteristics of the vehicle. The roll-stabilization load setting means is man­ually operable. The roll-stabilization setting means is operable in a MANUAL mode for determining the front and rear roll-stabilization load distribution accord­ing to a manually set value and an automatic mode for automatically determining the front and rear roll-stabili­zation load distribution according to a preselected con­trol parameter. The preselected control parameter is a steering angular displacement. The roll-stabilization load setting means varies the front and rear roll-stabili­zation load distribution indicating value so that the steering characteristics incline toward over-steering characteristics upon initiation of the steering operation and incline toward under-steering characteristics upon termination of the steering operation.

BRIEF DESCRIPTION OF THE DRAWINGS

In the drawings:

FIGS. 3(A) and 3(B) are enlarged sections showing the detail of the hydraulic pressure control valve of FIG. 2, in which, FIG. 3(A) shows the valve position softening the shock absorber and FIG. 3(B) shows the valve position hardening the shock absorber;

DESCRIPTION OF THE PREFERRED EMBODIMENT

Figure 1:
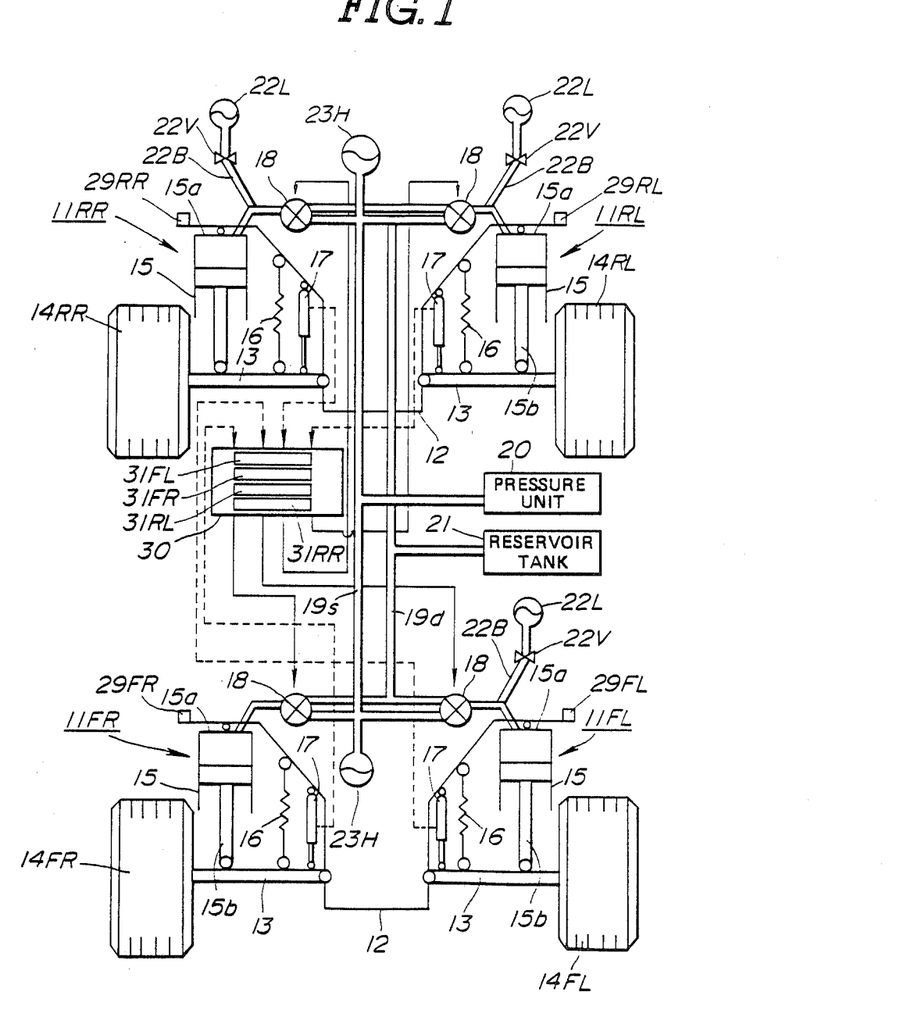
FIG. 1 is a diagrammatical illustration showing the overall construction of the preferred embodiment of an automotive suspension system with a control system actively controlling the suspension system according to the present invention.

Referring now to the drawing, particularly to FIG. 1, a vehicle has four suspension systems 11FL, 11FR, 11RL and 11RR for respectively suspending vehicle body 12 on the front-left, front-right, rear-left and rear-right road wheels 14FL, 14FR, 14RL and 14RR. Each of the front-left, front-right, rear-left and rear-right suspension systems 11FL, 11FR, 11RL and 11RR are constructed to form a so-called active suspension system which adjusts working fluid pressure in the suspension system for adjusting stiffness and damping characteristics of the suspension system in a positive manner for absorbing uncomfortable relatively high frequency and relatively small magnitude vibration input from the road wheels 14FL, 14FR, 14RL and 14RR and suppressing attitude change of a vehicle body.

Each suspension system 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator, and a coil spring 16. In the shown embodiment, the suspension coil spring 16 is not necessary to damp the bounding and rebounding kinematic energy and is required only to resiliently support the vehicle body on the road wheel resisting the static load due to the mass weight of the vehicle body. The suspension coil spring 16 should be weak enough not to produce damping force against vibrations to be transmitted between the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one section of the vehicle body 12. The lower end of the piston rod 15b is connected to the suspension member 13. Therefore, the piston 15c is thrustingly movable in bounding and rebounding directions relative to the cylinder housing 15a according to relative displacement between the vehicle body and the suspension member.

The hydraulic cylinder 15A of the suspension assembly 15 is connected to a hydraulic pressure source unit 20 via a hydraulic circuit which includes pressure control valve 18. The pressure control valve 18 employed in the shown embodiment is provided with an electrically operable actuator electrically operable according to a suspension control signal and connected to a control unit 30 to receive the suspension control signal therefrom. The hydraulic circuit includes a supply line 19s and a drain line 19d. High pressure accumulators 23H are connected to the supply line 19s and a low pressure accumulator 22L are connected between the pressure control valves 18 and the associated hydraulic cylinder 15A. The pressure source unit comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto.

As seen from FIG. 1, the low pressure accumulator 22L are connected to a branch pressure line 22B connected to the communication path 27 between the pressure control valves 18 and the upper fluid chambers 15d of the hydraulic cylinder 15A. A throttle valve 22V is inserted between the junction of the branch pressure line 22B and the communication path 27 and the low pressure accumulator 22L. The throttle valve 22V has a fixed throttling rate to provide a predetermined flow resistance against the working fluid flow therethrough.

The controller 30 is connected to a bounding and rebounding stroke sensors 29FL, 29FR, 29RL and 29RR. The bounding and rebounding stroke sensors 29FL, 29FR, 29RL and 29RR are respectively located just above the front-left, front-right, rear-left and rear-right wheels 14FL, 14FR, 14RL and 14RR to output bounding and rebounding stroke indicative signals $L_{FL}$, $L_{FR}$, $L_{RL}$ and $L_{RR}$. The controller 30 derives the suspension control signals for controlling respective pressure control valves 18 based on the bounding and rebounding stroke indicative signals $L_{FL}$, $L_{FR}$, $L_{RL}$ and $L_{RR}$.

Figure 2:
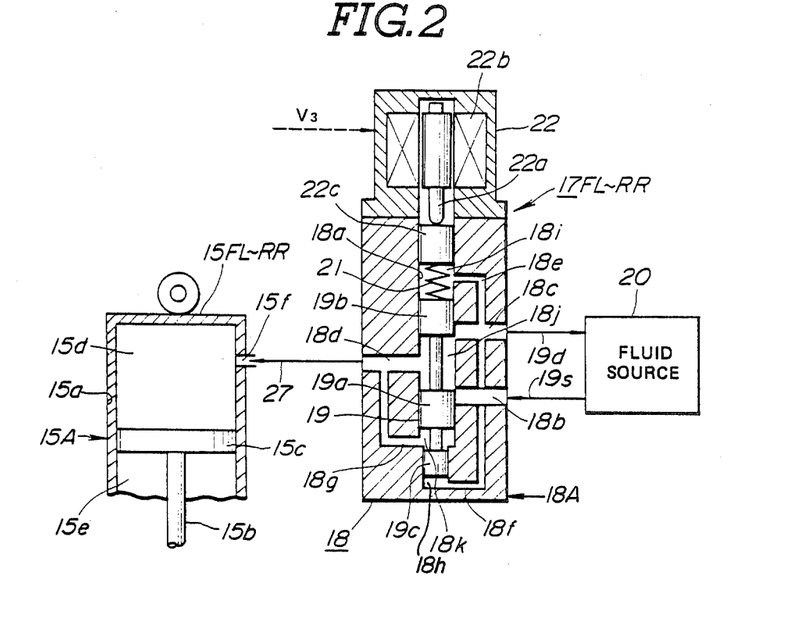
FIG. 2 is a section of one example of a hydraulic cylinder in combination with a hydraulic pressure con­trol valve associated with the shock absorber for adjust­ing stiffness of the latter.

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. The pressure control valve 18 has a valve housing 18A having the forementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and whereby communicated with the upper fluid chamber 15d. On the other hand, the pressure chamber 18j shifts according to shifting of the valve spool 19 to selectively communicate with the inlet port 18b and the drain port 18c. A pressure control chamber 18k is defined between the first and third lands 19a and 19c. The pressure control chamber 18k is in communication with the outlet port 18d via a pilot path 18g. A bias spring 22

$d$ is interposed between the actuator piston 22c and the valve spool 19. The spring force of the bias spring 22d balances with the hydraulic pressure in the pressure control chamber 18k to determine the valve spool position. The actuator piston 22c contacts with an actuator rod 22a of an electrically operable actuator 22 which comprises an electromagnetic solenoid. The solenoid 22 is a proportioning solenoid which varies magnitude of actuation of the actuator rod 22a to determine the valve spool position.

Figure 3:
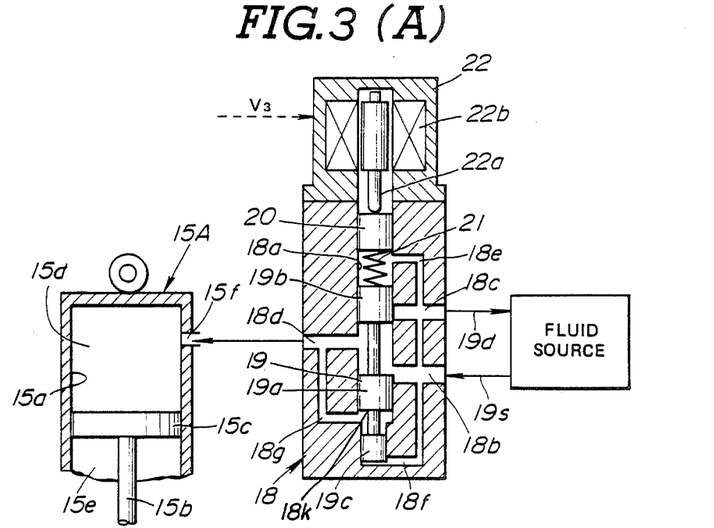

In order to increase the supply pressure of the working fluid, the spool valve 19 is shifted to the position shown in FIG. 3(A) to increase path area at a throttle positioned at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the drain port 18 which is normally blocked by means of the land 19b of the spool valve.

Construction of the pressure control valves should not be specified to the construction as illustrated in FIGS. 2, 3(A) and 3(B) but can be relaced with any appropriate constructions. For example, the pressure control valve constructions as illustrated in European Patent First Publication No. 01 93 124, set forth above, can also be employed. The disclosure of the aforementioned European Patent First Publication No. 01 93 12 is herein incorporated by reference for the sake of disclosure.

Figure 4:
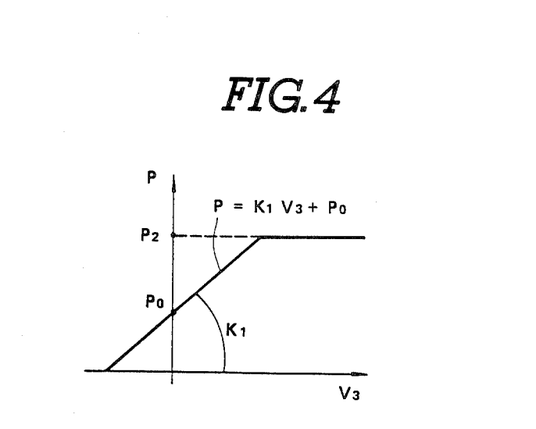
FIG. 4 is a graph showing variation of hydraulic pressure to be supplied to a pressure control valve ac­cording to variation of drive signal voltage.

As seen from FIG. 2, the proportioning solenoid 22 comprises the actuator rod 22a and a solenoid coil 22b. The solenoid coil 22b is energized by suspension control signal $V_3$ from the controller 30. Magnitude of energization is variable depending upon the signal level of the suspension control signal. Therefore, the proportioning solenoid 22 shifts the actuator rod in a magnitude proportional to the suspension control signal level. In the shown embodiment of the pressure control valve, the working fluid pressure P at the outlet port 18d is variable according to the characteristics shown in FIG. 4. Namely, when the suspension control signal $V_3$ is zero, the pressure P at the outlet port 18 becomes $P_0$ determined according to a predetermined offset pressure $P_0$. When the suspension control signal value in positive value increases, the fluid pressure P at the outlet port 18d increases with a predetermined proportioning gain $K_1$. Namely, by increasing of the suspension control valve $V_3$, the actuator rod 22a is driven downwardly in FIG. 2 at a magnitude toward to position of FIG. 3(A) to achieve increasing of the fluid pressure with the predetermined proportioning gain $K_1$. The fluid pressure P at the outlet port 18d saturate at the output pressure $P_2$ of the pressure unit 20. On the other hand, when the suspension control signal value $V_3$ decreases, the pressure P decreases to zero to by shifting of the actuator rod 22a toward the direction to FIG. 3(B).

The actuator rod 22a of the proportioning solenoid 22 is associated with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 2. The valve spool 19 also receives upward hydraulic force from the pressure control chamber 18k.

Therefore, the valve spool 19 is oriented at the position in the valve bore at the position where the downward bias of the bias spring 22d balances with the upward hydraulic force of the pressure control chamber 18k.

Here, the communication path 27, the outlet port 18d, the fluid chamber 15d of the hydraulic cylinder 15A and the pressure control valve 18 constitute the first hydraulic system. On the other hand, the low pressure accumulator 22L, the branch line 22B and the throttle valve 22V constitute the second hydraulic system with the fluid chamber 15d of the hydraulic cylinder 15A. The length and diameter of the pipe forming the communication path 27 is so selected as to generate a resistance against the working fluid flow therethrough. The flow resistance varies according to input vibration frequency which corresponds to the stroke speed of the piston 15c of the hydraulic cylinder 15A in non-linear fashion. More practically, the variation characteristics of the flow resistance in the communication path 27 is parabolic characteristics in relation to the vibration frequency. Furthermore, the flow resistance of the communication path is set smaller than the flow resistance in the second hydraulic system set forth above, when the input vibration frequency is lower than a broader frequency, e.g. 7 to 8 HZ) between the resonance frequency of the vehicle body and the resonance frequency of the suspension member as coupled with the road wheel. On the other hand, the flow resistance value of the communication path is set greater than or equal to the flow resistance in the second hydraulic system set forth above, when the input vibration frequency is higher than or equal to the broader frequency.

Figure 5:
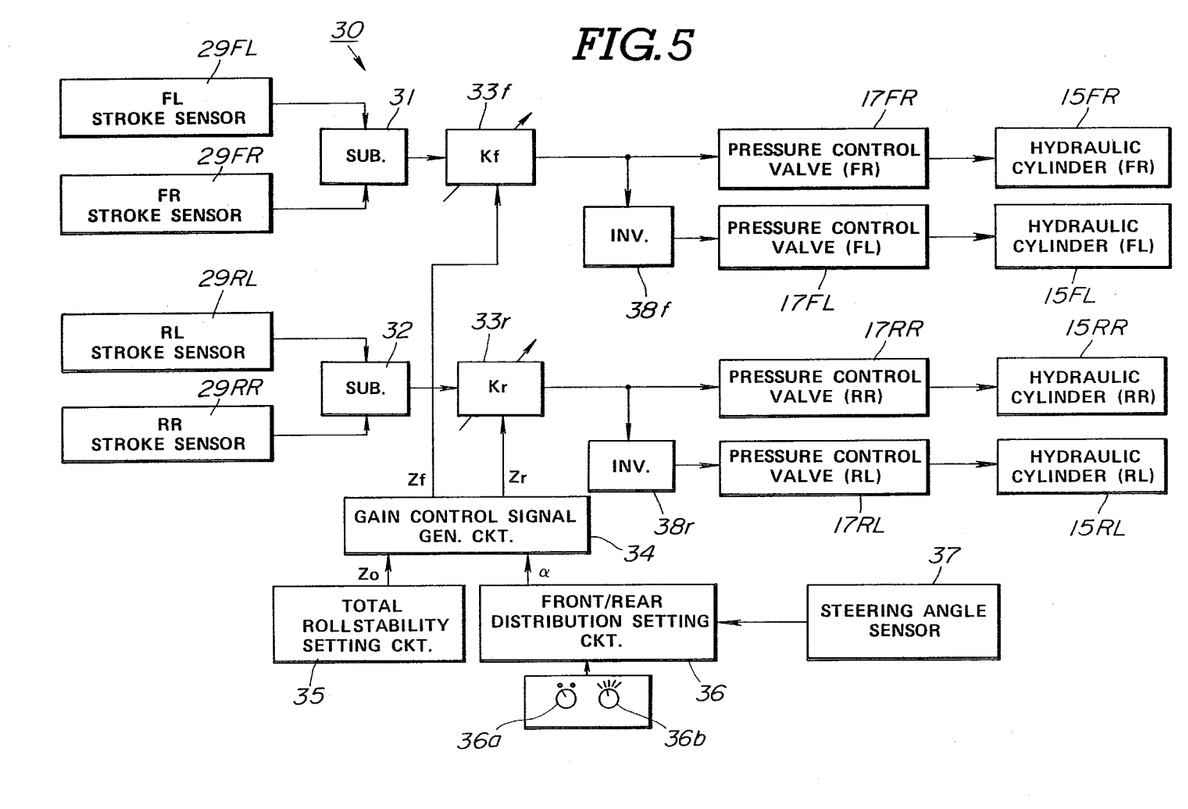
FIG. 5 is a block diagram of the preferred embodi­ment of a control circuit in the the active suspension control system according to the invention, which control circuit adjusts rolling-stability of the suspension system.

On the other hand, FIG. 5 shows the preferred embodiment of the control circuit for controlling the actively controlled suspension system of FIG. 1.

In the following discussion with respect to each component of the control circuit of FIG. 5, the bounding and rebounding stroke sensor 29FL for the monitoring bounding and rebounding stroke in the front-left suspension system 11FL will be referred to as 'front-left stroke sensor'; the bounding and rebounding stroke sensor 29FR monitoring the bounding and rebounding stroke in the front-right suspension system 11FR wll be referred to as 'front-right stroke sensor'; the bounding and rebounding stroke sensor 29RL monitoring the bounding and rebounding stroke in the rear-left suspension system 11RL will be referred to as 'rear-left stroke sensor'; and the bounding and rebounding stroke sensor 29RR monitoring the bounding and rebounding stroke in the rear-right suspension system 11RR will be referred to as 'rear-right stroke sensor'. It should be further noted that the bounding and rebounding stroke indicating sensor signal $L_{FL}$ produced by the front-left stroke sensor 29FL will be referred to as 'front-left bounding and rebounding stroke indicating signal'; the bounding and rebounding stroke indicating sensor signal $L_{FR}$ produced by the front-right stroke sensor 29FR will be referred to as 'front-right bounding and rebounding stroke indicating signal'; the bounding and rebounding stroke indicating sensor signal $L_{RL}$ produced by the rear-left stroke sensor 29RL will be referred to as 'rear-left bounding and rebounding stroke indicating signal'; the bounding and rebounding stroke indicating sensor signal $L_{RR}$ produced by the rear-right stroke sensor 29RR will be referred to as 'rear-right bounding and rebounding stroke indicating signal'.

As seen from FIG. 5, the controller 30 includes subtractor circuits 31 and 32, control signal generator circuits 33f and 33r, and inverter circuits 38f and 38r. As will be seen from FIG. 5, the control signal generator circuit 33f is designed for outputting control signal for controlling the pressure control valves 18 in the front-left and front-right suspension systems 11FL and 11FR, which is, therefore, referred to as 'front suspension control signal generator circuit'. Similarly, the control signal generator circuit 33r is designed for outputting the control signal for controlling the pressure control valves 18 in the rear-left and rear-right suspension systems 11RL and 11RR, which will be hereafter referred to as the 'rear suspension control signal. The subtractor circuit 31 has a non-inverting input terminal connected to the front-left stroke sensor 29FL and an inverting input terminal connected to the front-right stroke sensor 29FR. The front-right bounding and rebounding stroke indicative sensor signal value $L_{FR}$ is substracted from the front-left bounding and rebounding stroke indicating sensor signal $L_{FL}$ to derive a rolling magnitude indicating signal representative of the rolling magnitude at the front end of the vehicle body. This rolling magnitude indicating signal will be hereafter referred to as 'front rolling magnitude indicating signal'. Similarly, the subtractor circuit 32 has a non-inverting input terminal connected to the rear-left stroke sensor 29FL and an inverting input terminal connected to the rear-right stroke sensor 29FR. The rear-right bounding and rebounding stroke indicating sensor signal value $L_{RR}$ is substracted from the rear-left bounding and rebounding stroke indicating sensor signal $L_{RL}$ to derive a rolling magnitude indicating signal representative of the rolling magnitude at the rear end of the vehicle body. This rolling magnitude indicating signal will be hereafter referred to as 'rear rolling magnitude indicating signal'.

The control signal generator circuits 33f and 33r comprise gain-controlled amplifiers respectively having variable gains Kf and Kr. On the other hand, the control signal generator circuits 33f and 33r are connected to a roll-stability distribution derivation circuit 34. The gain control signal generator circuit 34 is, in turn, connected to a total roll-stability setting circuit 35, and a front/rear distribution setting circuit 36. The front/rear distribution setting circuit 36 is connected to a steering angle sensor 37 and a manual selector unit 36A which includes a mode selector switch 36a and a manual set switch 36b. In the preferred construction, the total roll-stability setting circuit 35 includes a manual selector switch provided adjacent the driver's seat in the vehicle cabin so that the driver may be able to reach for setting desired overall stiffness of the suspension systems and whereby for setting the total roll-stability. The total roll-stability setting circuit 35 outputs a set total roll-stability indicating signal $Z_0$ to the gain control signal generator circuit 34.

On the other hand, the front/rear distribution setting circuit 36 receives a mode selector signal from the manual selector unit 36A. In practice, the mode selector switch 36a of the manual selector unit 36A is operable for mannually selecting one of AUTO mode and MANUAL mode. The manual set switch is operable when the mode selector switch 36a is set at MANUAL mode position for setting front/rear distribution of the roll-stability. In the AUTO mode as selected by means of the mode selector switch 36a, the front-rear distribution setting circuit 36 is active to automatically adjust the front/rear distribution of the roll-stability in accordance with a predetermined front/rear distribution adjusting parameter. In the shown embodiment, the steering angle is taken as the front/rear distribution adjusting parameter. Therefore, the front/rear distribution setting circuit 36 is connected to the steering angle sensor 37 to receive therefrom a steering angle sensor. The steering angle sensor 37 may have per se well known construction and may comprise a photoelectric sensor, a potentiometer and so forth.

It should be appreciated that though the steering angle sensor 37 is employed in the shown embodiment as a sensor for detecting vehicular rolling condition and an the front/rear distribution adjusting parameter detecting means, it would be possible to employ other sensors which can satisfactorily detect the vehicular rolling condition, such as a lateral acceleration sensor, a lateral force sensor and so forth. Furthermore, the manual selector unit 36A may be provided adjacent the driver's seat so that the driver may easily reach the selector.

The front/rear distribution setting circuit 36 derives front/rear distribution based on the inputs from the manual selector unit 36A and the steering angle sensor 37. The front/rear distribution setting circuit 36 outputs a front/rear distribution indicating signal $\alpha$ to the gain control signal generator circuit 34.

Figure 6:
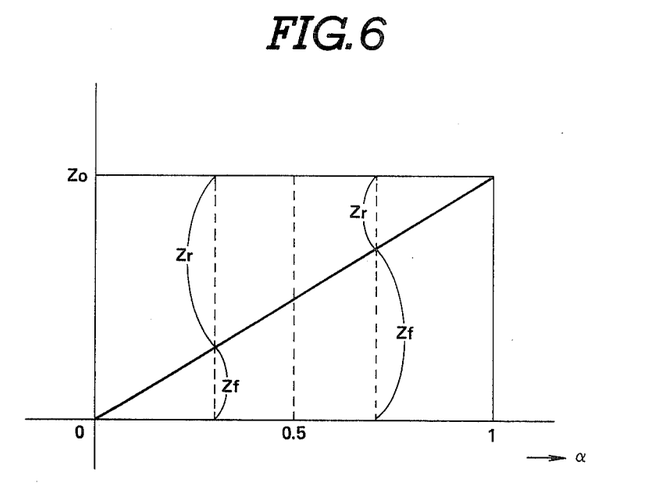
FIG. 6 is a chart showing distribution of the roll-stabilizing hydraulic pressure to be built-up in the front and rear suspension systems.

The gain control signal generator circuit 34 is responsive to the total roll-stability indicating signal $Z_0$ and the front/rear distribution indicating signal $\alpha$ to derive gain control signals Zf and Zr. The gain control signal Zf to be transmitted to the front suspension control signal generator circuit 33f for determining the amplifier gain Kf, which gain control signal for adjusting the amplifier gain Kf in the front suspension control signal generator circuit will be hereafter referred to as 'front gain control signal'. On the other hand, the gain control signal Zr is transmitted to the rear suspension control signal generator circuit 33r for determining the amplifier gain Kr, which gain control signal will be hereafter referred to as 'rear gain control signal'. In the practical operation, the front/rear distribution setting circuit 36 processes the manually set value indicating signal from the manual set switch 36b in the manual selector unit 36A as the mode selector switch 36a is set in MANUAL mode position, the mode selector signal from the mode selector switch and the steering angle signal from the steering angle sensor 37. When the MANUAL mode is selected through the mode selector switch 36a, the manually set value as represented by the manually set value indicating signal is output from the front/rear distribution setting circuit 36 as the front/rear distribution indicating signal $\alpha$. On the other hand, when AUTO mode is selected, the front/rear distribution setting circuit 36 derives the front/rear distribution value $\alpha$ according to the vehicular steering condition, automatically. In practice, the front/rear distribution setting circuit 36 sets the front/rear distribution value $\alpha$ at a predetermined initial value which is greater than or equal to 0.5, while the vehicle travels straight. On the other hand, the front-/rear distribution setting circuit 36 is responsive to initiation of the vehicular steering operation which is detected by monitoring change of the steering angle signal, to set the front/rear distribution value $\alpha$ at a value in a range of $\alpha$ to 0.5. The front/rear distribution setting circuit 36 is also responsive to termination of the vehicular steering operation which is detected by monitoring change of the steering angle signal, to set the front/rear distribution value $\alpha$ at a value in a range of 0.5 to 1. The relationship of the front and rear gain control signal values Zf and Zr with respect to the front/rear distribution indicating value α may be seen from FIG. 6.

The gain control signal generator circuit 34 receives the total roll-stability indicating signal $Z_0$ from the total roll-stability setting circuit 35 and the front/rear distribution indicating signal α from the front/rear distribution setting circuit 36. The gain control signal generator circuit 34 processes the inputs, i.e. $Z_0$ and α to derive the front gain control signal Zf and the rear gain control signal Zr according to the following equations:

$$Zf = \alpha \times Z_0 \quad (1)$$

$$Zf = Z_0 - Zf \quad (2)$$

The front suspension control signal generator circuit 33f receives the output of the subtractor circuit 31, which output of the subtractor is representative of the difference of the front-left and front-right stroke indicating signal values and thereby represents the magnitude of rolling at the front end. The front suspension control signal generator circuit 33f also receives the front gain control signal Zf from the gain control signal generator circuit 34. The front suspension control signal generator circuit 33f determines the amplifier gain Kf according to the front gain control signal value Zf and amplifies the front end rolling magnitude indicating subtractor output of the subtractor circuit 31 with the determined gain Rf in order to derive the front suspension control signal Cf. The front suspension control signal Cf is fed to the proportioning solenoid 22 of the pressure control valve 18 in the front-right suspension system 11FR. The front suspension control signal Cf is also fed to the proportioning solenoid 22 of the pressure control valve in the front-left suspension system 11FL via the inverter circuit 38f. Therfore, the different polarity of the front suspension control signals Cf are input to the solenoids 22 of the pressure control valves 18 in the front-right and front-left suspension systems 11FR and 11FL.

The rear suspension control signal generator circuit 33r receives the output of the subtractor circuit 32, which output of the subtractor is representative of the difference of the rear-left and rear-right stroke indicating signal values and thereby represents the magnitude of rolling at the rear end. The rear suspension control signal generator circuit 33r also receives the rear gain control signal Zr from the gain control signal generator circuit 34. The rear suspension control signal generator circuit 33r determines the amplifier gain Kr according to the rear gain control signal value Zr and amplifies the rear end rolling magnitude indicating subtractor output of the subtractor circuit 32 with the determined gain Kr in order to derive the rear suspension control signal Cr. The rear suspension control signal Cr is fed to the proportioning solenoid 22 of the pressure control valve 18 in the rear-right suspension system 11RR. The rear suspension control signal Cr is also fed to the proportioning solenoid 22 of the pressure control valve in the rear-left suspension system 11RL via the inverter circuit 38f. Therfore, the different polarity of the rear suspension control signals Cr are input to the solenoids 22 of the pressure control valves 18 in the rear-right and rear-left suspension systems 11RR and 11RL.

Assuming the load distribution at respective road wheels 14FL, 14FR, 14RL and 14RR are even, characteristics of respective hydraulic cylinders 15A, of the loop-gains of the hydraulic pressure control circuits and of coil springs are same, distribution of the rolling stability at the front and rear suspension systems can be controlled by adjusting the fluid pressures in the hydraulic cylinders according to the front and rear suspension control signals Cf and Cr. By controlling the roll-stability distribution at the front and rear suspension systems, vehicular steering characteristics can be adjusted.

Namely, when the front suspension control signal Cf has greater value than that of the rear suspension control signal Cr, the roll-stabilization load at the front suspension systems 11FL and 11FR becomes greater than that of the rear suspension systems 11RL and 11RR. This causes reducing the relative cornering force as a total cornering force of the front-left and front right suspension systems 11FL and 11FR at the front suspension systems to be smaller than that in the rear suspension systems. This increases cornering factor Ks to increase under-steering characteristics of the vehicle. On the other hand, when the rear suspension control signal Cr has greater value than that of the front suspension control signal Cf, the roll-stabilization load at the rear suspension systems 11RL and 11RR becomes greater than that of the front suspension systems 11FL and 11FR. This causes reducing the relative cornering force as a total cornering force of the rear-left and rear-right suspension systems 11RL and 11RR at the rear suspension systems to be smaller than that in the front suspension systems. This decreases cornering factor Ks to increase over-steering characteristics of the vehicle.

Operation of the preferred embodiment of the activelly controlled suspension system according to the invention will be described herebelow.

At first, it will be appreciated when the front suspension control signal value Cf is substantially same as the rear suspension control signal value Cr, the roll-stabilization load distribution at front and rear suspension systems becomes even to provide substantially neutral steering characteristics.

As will be appreciated, in general, the resonance frequency of the suspension member with the road wheel is higher than the resonance frequency of the vehicle body. Therefore, when the vibration is input from the suspension member, the vibration frequency is usually higher than the broader frequency. On the other hand, when the vehicle body causes rolling, pitching, bounding or so forth to input vibration, the vibration frequency is lower than the broader frequency. Since the flow resistance of the communication path 17 becomes greater than that of the second hydraulic system when the vibration is input from the suspension member. Therefore, in this case, the second hydraulic system becomes active to absorb vibration energy. On the other hand, when the vibration frequency is lower than the broader frequency during vehicular attitude change, such as vehicular rolling, pitching and bouncing and so forth, the first hydraulic system is active to adjust the fluid pressure in the fluid chamber 15d to suppress attitude change of the vehicle body.

For example, when bounding motion occurs at the suspension member, the piston 15c of the hydraulic cylinder 15A shifts upwardly to cause increasing of the fluid pressure in the upper chamber 15d. Since the input vibration frequency is higher than the broader frequency, the increased pressure is introduced into the low pressure accumulator 22L through the throttle valve 22V because the second hydraulic circuit has lower flow resistance than that of the first hydraulic circuit. In this case, the throttle valve generates a damping force against the piston stroke to successfully prevent the vibration energy input from the suspension member from being transmitted to the vehicle body.

Therefore, in response to the bounding motion of the suspension member causing increasing of the fluid pressure in the fluid chamber 15d, the pressurized fluid flows from the fluid chamber 15d to the low pressure accumulator 22L via the branch line 22B and the throttle valve 22V. Since the throttle valve 22V has a given throttling rate to limit fluid flow therethrough, this flow resistance serves as damping force for absorbing vibration energy so that the vibration energy is not transmitted to the vehicle body.

While the vehicle travels steadily as set forth above and assuming the AUTO mode is selected through the mode selector switch 36a of the manual selector unit 36A, the stroke indicating signals from respective stroke sensors 29FL, 29FR, 29RL and 29RR are substantially the same. Therefore, the outputs of the subtractor circuits 31 and 32 are held substantially at zero. As a result, the front and rear suspension control signals Cf and Cr become substantially zero. Therefore, the solenoid coils 22a of the proportioning solenoids 22 of the pressure control valves 18 are held deenergized to maintain the fluid pressure in the fluid chambers 15d of respective hydraulic cylinders 15A at the initial offset pressure $P_0$. In this condition, the aforementioned first hydraulic system in respective suspension systems are active for absorbing the road shock and other relatively high frequency vibrations.

In the alternative, it would be possible to avoid the first hydraulic system and absorb the road shock and so forth by the action of the valve spool 19 in response to pressure variation in the pressure control valve 18K. Namely in this case, when bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 21d and the upward hydraulic force of the pressure control chamber 18k. This causes upward movement of the valve spool 19 against the spring force of the bias spring 22d, as shown in FIG. 3(B). As a result, path area of the drain port 18c increases and the inlet port 18b becomes blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body. On the other hand, when rebounding motion occurs at the suspension member, the piston 15c of the hydraulic cylinder 15A shifts downwardly to cause decreasing of the fluid pressure in the upper chamber 15d. This causes decreasing of the fluid pressure at the outlet port 18d of the pressure control valve 18. As a result, the fluid pressure in the pressure control chamber 18k decreases by the pressure introduced through the pilot path 18q to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result, path area of the inlet port 18b increases and the drain port 18c becomes being blocked. Therefore, the fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Figure 7:
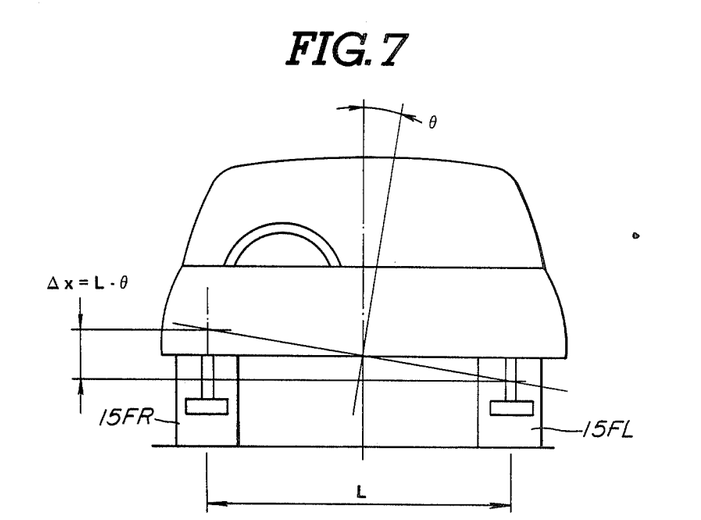
FIG. 7 is an explanatory illustration to be utilized for discussion of the roll-stabilizing operation of the preferred embodiment of the actively controlled suspension system.

If a steering operation is performed for making left-hand turn, the vehicle body rolls to lower the left side and to lift-up the right side so that the vehicle body declines toward left by an angle $\theta$ with respect to the horizontal plane, as shown in FIG. 7. When the front suspension systems are concerned, the front-left stroke sensor 29FL and the front-right stroke sensor 29FR respectively produce the stroke indicating signals $L_{FL}$ and $L_{FR}$. The difference $\Delta x$ of the stroke indicating signals $L_{FL}$ and $L_{FR}$ represents the magnitude of vehicular rolling at the front suspension systems. Assuming a distance between treads of the front wheels 14FL and 14FR are L, the difference $\Delta x$ may be illustrated by the following equation (3):

$$\neq 6 \; x = L_{FL} - L_{FR} = L \times \theta \tag{3}$$

Accordingly, the front suspension control signals to be derived in the front suspension control signal generator circuit 33f can be illustrated by the following equation (4):

$$Vf = Kf \times \Delta x = Kf \times L \times \theta \tag{4}$$

Assuming the proportional gain of the pressure control valves 18 are K1, the pressure variation $\Delta P$ in the hydraulic cylinders 15A in the front suspension systems 11FL and 11FR can be illustrated by the following equation (5):

$$\Delta P = K_1 \times Vf = Vf = K_1 \times Kf \times L \times \theta \tag{5}$$

Since the hydraulic force to be generated in each cylinder is A (effective area) $\times \Delta P$, the rolling moment Mr can be illustrated by the following equation:

$$\begin{aligned} Mr &= A \times \Delta P \times L \\ &= A + K_1 \times Kf \times L^2 \times \theta \end{aligned} \tag{6}$$

According to the foregoing equation (6), the roll-stabilizing force $m_f$ can be obtained from the following equation (7):

$$m_f = A \times K_1 \times L^2 \times Kf \tag{7}$$

This can be regarded as substantially equivalent to the roll-stabilizing force to be created by the conventional roll-stabilizers.

On the other hand, upon initiation of the steering operation, the front/rear distribution setting circuit 36 detects the fact based on variation of the steering angle signal from the steering angle sensor 37. As set forth, since the Auto mode is selected, the front/rear distribution setting circuit 36 sets the front/rear distribution indicating value $\alpha$ within a range of 0.5 to 1 for a given period of time. Therefore, the front gain control signal Zf to be fed to the front suspension control signal generator circuit 33f becomes greater than the rear suspension control signal Zf which is to be fed to the rear suspension control signal generator circuit 33r. Therefore, the front amplifier gain Kf of the front suspension control signal generator circuit 33f becomes greater than the rear amplifier gain Kr of the rear suspension control signal generator 33r. Assuming the rolling magnitude at front suspension systems 11FL and 11FR and the rear suspension systems 11RL and 11RR are the same, the fluid pressure variation ΔP in the front suspension systems becomes greater than that of the rear suspension systems. This increases over-steering characteristics of the vehicle to provide better turning ability.

In a practical suspension control for the front suspension systems 11FL and 11FR, the front suspension control signal Cf which becomes the negative value, is fed to the proportioning solenoid 22 of the pressure control valve 18 in the front-left suspension system 11FL via the inverter 38f. Therefore, the proportioning solenoid 22 becomes active to operate the pressure control valve 18 in the front-left suspension system to increase the fluid pressure in the front-left suspension system to raise the left side of the vehicle body toward the neutral position. On the other hand, the negative value of front suspension control signals Cf is directly fed to the proportioning solenoid 22 of the pressure control valve 18 in the front-right suspension system 11FR. Therefore, the proportioning solenoid 22 becomes active to operate the pressure control valve 18 in the front-right suspension system to decrease the fluid pressure in the front-right suspension system to lower the right side of the vehicle body toward the neutral position. Therefore, the vahicle rolling can be successfully suppressed.

Similarly, the rear suspension control signal Cr is derived substantially in the same manner as that for the front suspension control signal and has greater absolute value than that of the front suspension control signal. The rear suspension control signals Cr which becomes a negative value, is fed to the proportioning solenoid 22 of the pressure control valve 18 in the rear-left suspension system 11RL via the inverter 38r. Therefore, the proportioning solenoid 22 becomes active to operate the pressure control valve 18 in the rear-left suspension system to increase the fluid pressure in the rear-left suspension system to raise the left side of the vehicle body toward the neutral position. On the other hand, the negative value of rear suspension control signals Cr is directly fed to the proportioning solenoid 22 of the pressure control valve 18 in the rear-right suspension system 11RR. Therefore, the proportioning solenoid 22 becomes active to operate the pressure control valve 18 in the rear-right suspension system to decrease the fluid pressure in the rear-right suspension system to lower the right side of the vehicle body toward the neutral position. Therefore, vehicle rolling can be successfully suppressed.

On the other hand, upon termination of the steering operation, the front/rear distribution setting circuit 36 detects that fact based on variation of the steering angle signal from the steering angle sensor 37. As set forth, since the Auto mode is selected, the front/rear distribution setting circuit 36 sets the front/rear distribution indicating value α within a range of 0 to 0.5 for a given period of time. Therefore, the front gain control signal Zf to be fed to the front suspension control signal generator circuit 33f becomes smaller than the rear suspension control signal Zr which is to be fed to the rear suspension control signal generator circuit 33r. Therefore, the front amplifier gain Kf of the front suspension control signal generator circuit 33f becomes smaller than the rear amplifier gain Kr of the rear suspension control signal generator 33r. Assuming the rolling magnitude at front suspension systems 11FL and 11FR and the rear suspension systems 11RL and 11RR are the same, the fluid pressure variation ΔP in the front suspension systems becomes smaller than that of the rear suspension systems. This increases under-steering characteristics of the vehicle to provide better stability.

Therefore, according to the shown embodiment, the active suspension system according to the present invention, exhibits roll-stabilization ability equivalent to the conventional mechanical roll-stabilizer. In addition to this, the shown embodiment of the active suspension system can provide improved cornering characteristics with variation of the steering characteristics during cornering.

In addition, the shown embodiment is provided capability of manually setting the front/read distribution value in MANUAL mode, steering characteristics fitting the driver's taste can be selected.

Figure 8:
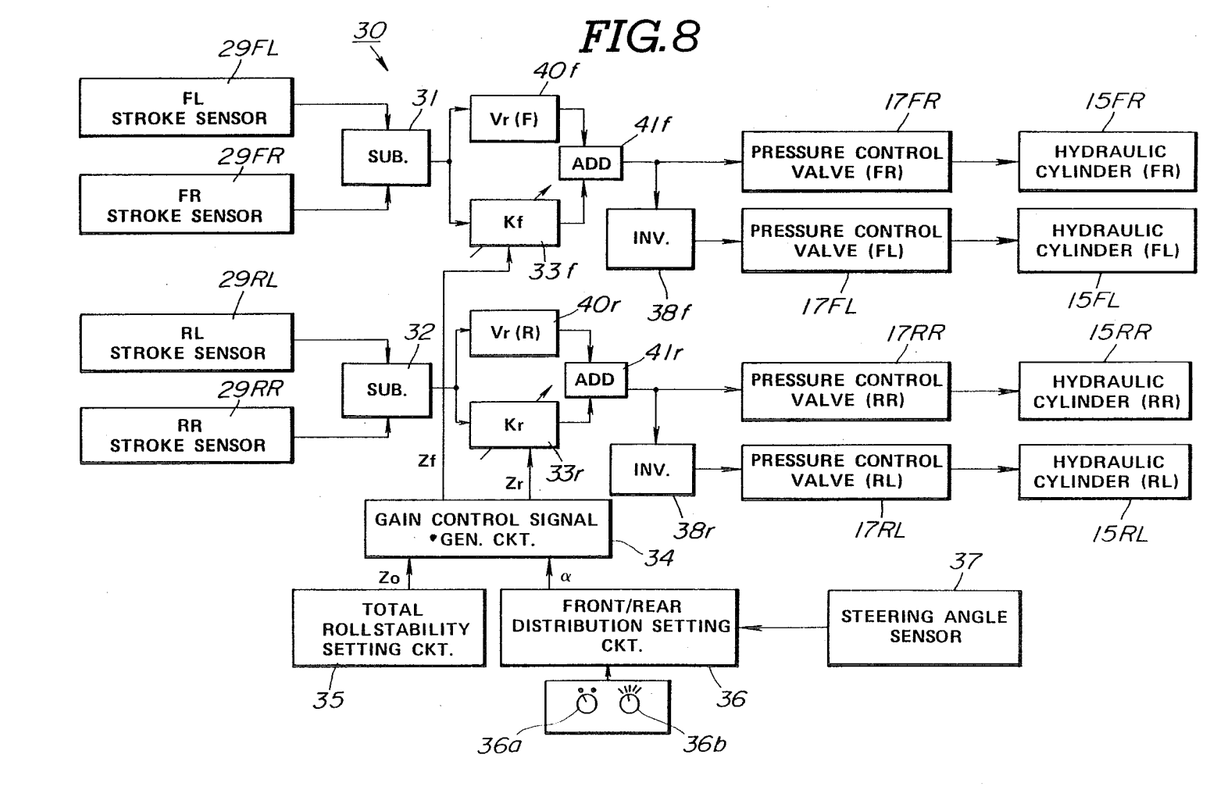
FIG. 8 is a block diagram of a modified embodiment of the control circuit in the actively controlled suspension system according to the invention.

FIG. 8 shows a modified embodiment of the actively controlled suspension system according to the invention. In this modified embodiment, the suspension system is provided with a roll-damping factor in addition roll-stabilization characteristics. The roll-damping factor Vr is variable depending upon the stroke speed in bounding and rebounding motion of the vehicular rolling. For incorporating the roll-damping factor in the active suspension control, the controller 30 is provided front roll-damping factor derivation circuits 40f and 40r. The differentiation circuits 40f and 40r are respectively connected to the corresponding subtractor circuits 31 and 32 to receive therefrom the rolling magnitude indicating signals. In addition, adder circuits 41f and 41r are provided for obtaining sum values of the outputs of the front suspension control signal generator circuit 33f and the front roll-damping factor derivation circuit 40f and outputs of the rear suspension control signal generator circuit 33r and the rear roll-damping factor derivation circuit 40r. The sum values obtained in the adder circuits 41f and 41r serves as modified front and rear suspension control signals modified by the roll-damping factors Vr.

The front roll-damping factor derivation circuit 40f receives the rolling magnitude indicating signal from the subtractor circuit 31, which is indicates a difference of the stroke indicating signals from the front-left and front right stroke sensors 29FL and 29FR. The front roll-damping factor derivation circuit 40f differentiates the received rolling magnitude indicating value to obtain a rolling speed indicating value. The obtained rolling speed indicative value is amplified with a predetermined gain K. The amplified rolling speed indicating value serves as the front roll-damping factor value $Vr_f$.

On the other hand, the rear roll-damping factor derivation circuit 40r receives the rolling magnitude indicating signal from the subtractor ciucuit 32, which is indicates a difference of the stroke indicating signals from the rear-left and rear-right stroke sensors 29RL and 29RR. The rear roll-damping factor derivation circuit 40r differentiates the received rolling magnitude indicating value to obtain a rolling speed indicating value. The obtained rolling speed indicating value is amplified with a predetermined gain K. The amplified rolling speed indicating value serves as the rear roll-damping factor value $Vr_r$.

In a practical operation for suppressing vehicular rolling in right-hand steering, the negative value of the front suspension control signals Cf is derived in the front suspension control signal generator circuit 33f on the basis of the rolling magnitude indicating signal from the subtractor circuit 31. At the same time, the front roll-damping factor derivation circuit 40f derives the front roll-damping factor indicating value $Vr_f$. The front suspension control signal Cf and the front roll-damping factor indicating signal $Vr_f$ are fed to the adder circuit 41f. Therefore, the adder circuit 41f outputs the modified front suspension control signal Cf' as modified by the front roll-damping factor $Vr_f$. The modified front suspension control signal Cf' is fed to the proportioning solenoid 22 of the pressrue control valve 18 in the front-left suspension system 11FL via the inverter 38f. Therefore, the proportioning solenoid 22 becomes active to operate the pressure control valve 18 in the front-left suspension system to increase the fluid pressure in the front-left suspension system to raise the left side of the vehicle body toward the neutral position. On the other hand, the negative value of front suspension control signals Cf is directly fed to the proportioning solenoid 22 of the pressure control valve 18 in the front-right suspension system 11FR. Therefore, the proportioning solenoid 22 becomes active to operate the pressure control valve 18 in the front-right suspension system to decrease the fluid pressure in the front-right suspension system to lower the right side of the vehicle body toward the neutral position. Therefore, the vehicle rolling can be successfully suppressed.

Similarly, the negative value of the rear suspension control signal Cr is derived by the rear suspension control signal generator circuit 33r. Simultaneously, the rear roll-damping factor indicating value $Vr_r$ is derived by the rear roll-damping factor derivation circuit 40r. The sum value of the rear suspension control signal Cr and the rear roll-damping factor indicating value $Vr_r$ is obtained in the adder circuit 41r and output as the modified rear suspension control signal Cr'. The modified rear suspension control signals Cr' is fed to the proportioning solenoid 22 of the pressure control valve 18 in the rear-left suspension system 11RL via the inverter 38r. Therefore, the proportioning solenoid 22 becomes active to operate the pressure control valve 18 in the rear-left suspension system to increase the fluid pressure in the rear-left suspension system to raise the left side of the vehicle body toward the neutral position. On the other hand, the negative value of the modified rear suspension control signals Cr' is directly fed to the proportioning solenoid 22 of the pressure control valve 18 in the rear-right suspension system 11RR. Therefore, the proportioning solenoid 22 becomes active to operate the pressure control valve 18 in the rear-right suspension system to decrease the fluid pressure in the rear-right suspension system to lower the right side of the vehicle body toward the neutral position. Therefore, the vehicle rolling can be successfully suppressed.

As will be appreciated, by adding the roll-damping factor, rolling speed dependent roll-stabilization becomes possible. This will be advantageous to suppress rapid change of the vehicular attitude in vehicular rolling to increase roll-stability of the vehicle.

Though the embodiments has been disclosed for suppressing the attitude change of the vehicle body by adjusting the vehicle height, it should be possible to adjust only damping characteristics in response to the bounding and rebounding strokes of the hydraulic cylinder. Furthermore, though the stroke sensor comprises the potentiometer in the shown embodiment, any appropriate sensors, such as differential transducers, ultrasonic distance sensor and so forth, may be applicable. In addition, the hydraulic cylinder may be replaced with any appropriate suspension element, such as pneumatic cylinder, hydropneumatic cylinder and so forth.

What is claimed is:

1. An actively controlled suspension system for an automotive vehicle comprising:

first fluid pressure means provided at one lateral side of the vehicle body and interposed between a vehicle body and a suspension member rotatably supporting a road wheel, said first fluid pressure means having a first variable pressure chamber;

second fluid pressure means provided at the other lateral side of the vehicle body and interposed between the vehicle body and a suspension member rotatably supporting a road wheel, said second fluid pressure means having a second variable pressure chamber;

sensor means for monitoring relative distance between said vehicle body and said suspension members for producing a sensor signal indicative thereof;

a controller receiving said sensor signal to detect vehicular rolling condition based thereon, and deriving a control signal based on the detected rolling condition for adjusting the fluid pressure in said first and second variable pressure chambers in such a manner that said fluid pressure in one of said first and second variable pressure chambers is increased and the fluid pressure in the other of said first and second variable pressure chambers is decreased in order to suppress vehicular rolling;

said sensor means comprises a first sensor provided at the one lateral side of said vehicle body for monitoring bounding and rebounding motion of the one corresponding side of the vehicle body and a second sensor provided at the other lateral side of said vehicle body for monitoring bounding and rebounding motion of the other corresponding side of the vehicle body;

said controller derives a difference between the output values of said first and second sensors for detecting rolling magnitude of the vehicle body for deriving said control signal; and said controller further derives a rolling speed to derive a roll-damping factor value to modify said control signal value with said roll-damping factor indicating value.

2. An actively controlled suspension system as set forth in claim 1, wherein magnitudes of increasing of the fluid pressure in one of said first and second variable pressure chambers substantially corresponds with the magnitude of decreasing of the fluid pressure in the other of said first and second variable pressure chambers.

3. An actively controlled suspension system for an automotive vehicle comprising:

first fluid pressure means provided at a front portion of a first lateral side of a vehicle body and interposed between the vehicle body and a suspension member rotatably supporting a road wheel, said first fluid pressure means having a first variable pressure chamber;

second fluid pressure means provided at a front portion of a second lateral side of the vehicle body and interposed between the vehicle body and a suspension member rotatably supporting a road wheel, said second fluid pressure means having a second variable pressure chamber;

third fluid pressure means provided at a rear portion of the first lateral side of the vehicle body and interposed between the vehicle body and a suspension member rotatably supporting a road wheel, said third fluid pressure means having a third variable pressure chamber;

fourth fluid pressure means provided at a rear portion of the second lateral side of the vehicle body and interposed between the vehicle body and a suspension member rotatably supporting a road wheel, said fourth fluid pressure means having a fourth variable pressure chamber;

sensor means including a first sensor located at a position corresponding to said first fluid pressure means, a second sensor located at a position corresponding to said second fluid pressure means, a third sensor located at a position corresponding to said third fluid pressure means, and a fourth sensor located at a position corresponding to said fourth fluid pressure means, and a fourth sensor located at a position corresponding to said fourth fluid pressure means, each of said sensors monitoring relative distance between said vehicle body and said suspension member at the corresponding position of the vehicle body, said first, second, third and fourth sensors producing first, second, third and fourth sensor signals, respectively, indicating the relative distance at the associated portion of the vehicle body;

means for setting a roll-stabilization load distribution between the front side and rear side of the vehicle body for producing a front and rear roll-stabilization load distribution indicating value; and a controller receiving said sensor signals to detect vehicular rolling condition based thereon, and deriving a control signal based on the detected rolling condition and set front and rear roll-stabilization load indicating values for adjusting the fluid pressure in said first and second variable pressure chambers in such a manner that said fluid pressure in one of said first and second variable pressure chambers is increased and the fluid pressure in the other of said first and second variable pressure chambers is decreased in order to suppress vehicular rolling.

4. An actively controlled suspension system as set forth in claim 3, wherein said roll-stablization load setting means varies said front and rear roll-stabilization load distribution indicating value for varying steering characteristics of the vehicle.

5. An actively controlled suspension system as set forth in claim 3, wherein said roll-stabilization load setting means is manually operable.

6. An actively controlled suspension system as set forth in claim 5, wherein said roll-stabilization setting means is operable in a MANUAL mode for determining said front and rear roll-stabilization load distribution according to a manually set value and an automatic mode for automatically determining the front and rear roll-stabilization load distribution according to a preselected control parameter.

7. An actively controlled suspension system as set forth in claim 6, wherein said preselected control parameter is a steering angular displacement.

8. An actively controlled suspension system as set forth in claim 7, wherein said roll-stabilization load setting means varies said front and rear roll-stabilization load distribution indicating value for increasing over-steering characteristics upon initiation of the steering operation and for increasing under-steering characteristics upon termination of the steering operation.

9. An anti-roll suspension control system in an actively controlled suspension system for an automotive vehicle, comprising:

first fluid pressure means provided at one lateral side of the vehicle body and interposed between a vehicle body and a suspension member rotatably supporting a first road wheel, for suspending said vehicle body on said suspension member, said first fluid pressure means having a first variable pressure chamber;

second fluid pressure means provided at the other lateral side of the vehicle body and interposed between said vehicle body and a suspension member rotatably supporting a second road wheel, for suspending said vehicle body on said suspension member, said second fluid pressure means having a second variable pressure chamber;

sensor means for monitoring vehicular rolling magnitude and rolling direction to produce a sensor signal indicative thereof;

a controller responsive to said sensor signal, for deriving a suspension control signal for adjusting fluid pressure in said first and second variable pressure chambers, said controller being responsive to said sensor signal indicative of vehicular rolling in a first direction to produce said suspension control signal for increasing fluid pressure in said first variable pressure chamber at a magnitude corresponding to the vehicular rolling magnitude represented by said sensor signal and decreasing fluid pressure in said second variable pressure chamber at a magnitude corresponding to the vehicular rolling magnitude, and being responsive to said sensor signal indicative of vehicular rolling in a second direction opposite to said first direction to produce said suspension control signal for increasing fluid pressure in said second variable pressure chamber at a magnitude corresponding to the vehicular rolling magnitude represented by said sensor signal and decreasing fluid pressure in said first variable pressure chamber at a magnitude corresponding to the vehicular roller magnitude, said controller holding the total magnitude of a damping force to be produced by said first and second variable pressure chambers constant in response to the vehicular rolling.

10. An anti-roll suspension control system in an actively controlled suspension system for an automotive vehicle, comprising:

first fluid pressure means provided at one lateral side of the vehicle body and interposed between a vehicle body and a suspension member rotatably supporting a first road wheel, for suspending said vehicle body on said suspension member, said first fluid pressure means having a first variable pressure chamber;

second fluid pressure means provided at the other lateral side of the vehicle body and interposed between said vehicle body and a suspension member rotatably supporting a second road wheel, for suspending said vehicle body on said suspension member, said second fluid pressure means having a second variable pressure chamber;

sensor means for monitoring vehicular rolling magnitude and rolling direction to produce a sensor signal indicative thereof;

a controller responsive to said sensor signal, for deriving a suspension control signal for adjusting fluid pressure in said first and second variable pressure chambers, said controller being responsive to said sensor signal indicative of vehicular rolling in a first direction to produce said suspension control signal for increasing fluid pressure in said first variable pressure chamber at a magnitude corresponding to the vehicular rolling magnitude represented by said sensor signal and decreasing fluid pressure in said second variable pressure chamber at a magnitude correspondiñg to the vehicular rolling magnitude, and being responsive to said sensor signal indicative of vehicular rolling in a second direction opposite to said first direction to produce said suspension control signal for increasing fluid pressure in said second variable pressure chamber at a magnitude corresponding to the vehicular rolling magnitude represented by said sensor signal and decreasing fluid pressure in said first variable pressure chamber at a magnitude corresponding to the vehicular rolling magnitude, said controller deriving the magnitude of increasing and decreasing fluid pressure in said first and second variable pressure chambers in even values.

11. An anti-roll suspension control system in an actively controlled suspension system for an automotive vehicle, comprising:

first fluid pressure means provided at one lateral side of the vehicle body and interposed between a vehicle body and a suspension member rotatably supporting a first road wheel, for suspending said vehicle body on said suspension member, said first fluid pressure means having a first variable pressure chamber connected to a pressurized fluid source via a first hydraulic circuit;

second fluid pressure means provided at the other lateral side of the vehicle body and interposed between said vehicle body and a suspension member rotatably supporting a second road wheel, for suspending said vehicle body on said suspension member, said second fluid pressure means having a second variable pressure chamber connected to a pressurized fluid source via a second hydraulic circuit;

a first pressure control valve means, disposed within said first hydraulic circuit for adjusting fluid pressure in said first variable pressure chamber;

a second pressure control valve means, disposed within said second hydraulic circuit for adjusting fluid pressure in said second variable pressure chamber;

sensor means for monitoring a vehicular rolling magnitude and rolling direction to produce a sensor signal indicative thereof;

a controller responsive to said sensor signal, for deriving a suspension control signal for said first and second pressure control valve means for adjusting fluid pressure in said first and second variable pressure chamber, said controller being responsive to said sensor signal indicative of vehicular rolling in a first direction to produce said suspension control signal for increasing fluid pressure in said first variable pressure chamber at a magnitude corresponding to the vehicular roller magnitude represented by said sensor signal and decreasing fluid pressure in said second variable pressure chamber at a magnitude corresponding to the increasing magnitude of fluid pressure in said first variable pressure chamber, and being responsive to said sensor signal indicative of vehicular rolling for increasing fluid pressure in said second variable pressure chamber at a magnitude corresponding to the vehicular rolling magnitude represented by said sensor signal and decreasing fluid pressure in said first variable pressure chamber at a magnitude corresponding to an increasing magnitude of fluid pressure in said second variable pressure chamber.

12. An anti-pitching suspension control system in an actively controlled suspension system for an automotive vehicle, comprising:

first fluid pressure means provided at one longitudinal side of the vehicle body and interposed between a vehicle body and a suspension member rotatably supporting a first road wheel, for suspending said vehicle body on said suspension member, said first fluid pressure means having a first variable pressure chamber;

second fluid pressure means provided at the other longitudinal side of the vehicle body and interposed between said vehicle body and a suspension member rotatably supporting a second road wheel, for suspending said vehicle body on said suspension member, said second fluid pressure means having a second variable pressure chamber;

sensor means for monitoring vehicular pitching magnitude and pitching direction to produce a sensor signal indicative thereof;

a controller responsive to said sensor signal, for deriving a suspension control signal for adjusting fluid pressure in said first and second variable pressure chambers, said controller being responsive to said sensor signal indicative of vehicular pitching in a first direction to produce said suspension control signal for increasing fluid pressure in said first variable pressure chamber at a magnitude corresponding to the vehicular pitching magnitude represented by said sensor signal and decreasing fluid pressure in said second variable pressure chamber at a magnitude corresponding to the vehicular pitching magnitude, and being responsive to said sensor signal indicative of vehicular pitching in a second direction opposite to said first direction to produce said suspension control signal for increasing fluid pressure in said second variable pressure chamber at a magnitude corresponding to the vehicular pitching magnitude represented by said sensor signal and decreasing fluid pressure in said first variable pressure chamber at a magnitude corresponding to the vehicular pitching magnitude, said controller holding the total magnitude of a damping force to be produced by said first and second variable pressure chambers constant in response to the vehicular pitching.

13. An anti-pitching suspension control system in an actively controlled suspension system for an automotive vehicle, comprising:

first fluid pressure means provided at one longitudinal side of the vehicle body and interposed between a vehicle body and a suspension member rotatably supporting a first road wheel, for suspending said vehicle body on said suspension member, said first fluid pressure means having a first variable pressure chamber;

second fluid pressure means provided at the other longitudinal side of the vehicle body and interposed between said vehicle body and a suspension member rotatably supporting a second road wheel, for suspending said vehicle body on said suspension member, said second fluid pressure means having a second variable pressure chamber;

sensor means for monitoring vehicular pitching magnitude and pitching direction to produce a sensor signal indicative thereof;

a controller responsive to said sensor signal, for deriving a suspension control signal for adjusting fluid pressure in said first and second variable pressure chambers, said controller being responsive to said sensor signal indicative of vehicular pitching in a first direction to produce said suspension control signal for increasing fluid pressure in said first variable pressure chamber at a magnitude corresponding to the vehicular pitching magnitude represented by said sensor signal and decreasing fluid pressure in said second variable pressure chamber at a magnitude corresponding to the vehicular pitching magnitude, and being responsive to said sensor signal indicative of vehicular pitching in a second direction opposite to said first direction to produce said suspension control signal for increasing fluid pressure in said second variable pressure chamber at a magnitude corresponding to the vehicular pitching magnitude represented by said sensor signal and decreasing fluid pressure in said first variable pressure chamber at a magnitude corresponding to the vehicular pitching magnitude, said controller deriving the magnitude of increasing and decreasing fluid pressure in said first and second variable pressure chambers in even values.

14. An anti-pitching suspension control system in an actively controlled suspension system for an automotive vehicle, comprising:

first fluid pressure means provided at one longitudinal side of the vehicle body and interposed between a vehicle body and a suspension member rotatably supporting a first road wheel, for suspending said vehicle body on said suspension member, said first fluid pressure means having a first variable pressure chamber connected to a pressurized fluid source via a first hydraulic circuit;

second fluid pressure means provided at the other longitudinal side of the vehicle body and interposed between said vehicle body and a suspension member rotatably supporting a second road wheel, for suspending said vehicle body on said suspension member, said second fluid pressure means having a second variable pressure chamber connected to a pressurized fluid source via a second hydraulic circuit;

a first pressure control valve means, disposed within said first hydraulic circuit for adjusting fluid pressure in said first variable pressure chamber;

a second pressure control valve means, disposed within said second hydraulic circuit for adjusting fluid pressure in said second variable pressure chamber;

sensor means for monitoring vehicular pitching magnitude and pitching direction to produce a sensor signal indicative thereof;

a controller responsive to said sensor signal, for deriving a suspension control signal for said first and second pressure control valve means for adjusting fluid pressure in said first and second variable pressure chambers, said controller being responsive to said sensor signal indicative of vehicular pitching in a first direction to produce said suspension control signal for increasing fluid pressure in said first variable pressure chamber at a magnitude corresponding to the vehicular pitching magnitude represented by said sensor signal and decreasing fluid pressure in said second variable pressure chamber at a magnitude corresponding to the increasing magnitude of fluid pressure in said first variable pressure chamber, and being responsive to said sensor signal indicative of vehicular pitching for increasing fluid pressure in said second variable pressure chamber at a magnitude corresponding to the vehicular pitching magnitude represented by said sensor signal and decreasing fluid pressure in said first variable pressure chamber at a magnitude corresponding to the increasing magnitude of fluid pressure in said second variable pressure chamber.

* * * * *